United States Patent
Kato (10) Patent No.: US 9,535,231 B2
(45) Date of Patent: Jan. 3, 2017

(54) OPTICAL FIBER ASSEMBLY

(71) Applicant: FUJIKURA LTD., Koto-ku, Tokyo (JP)

(72) Inventor: Seiji Kato, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/662,707

(22) Filed: Mar. 19, 2015

(65) Prior Publication Data

US 2015/0268432 A1 Sep. 24, 2015

(30) Foreign Application Priority Data

Mar. 20, 2014 (JP) ................. 2014-058844

(51) Int. Cl.
G02B 6/44 (2006.01)
G02B 6/36 (2006.01)
G02B 6/42 (2006.01)

(52) U.S. Cl.
CPC .............. *G02B 6/4488* (2013.01); *G02B 6/36* (2013.01); *G02B 6/4248* (2013.01); *G02B 6/4471* (2013.01)

(58) Field of Classification Search
CPC ................................... G02B 6/44; G02B 6/36
USPC ......................................................... 385/100
See application file for complete search history.

(56) References Cited

U.S. PATENT DOCUMENTS

| | | | |
|---|---|---|---|
| 4,750,804 A | 6/1988 | Osaka et al. | |
| 5,231,685 A * | 7/1993 | Hanzawa | G02B 6/4292 385/139 |
| 2002/0102088 A1* | 8/2002 | Kondo | G02B 6/3608 385/134 |
| 2005/0013573 A1* | 1/2005 | Lochkovic | G02B 6/4402 385/128 |
| 2013/0121656 A1* | 5/2013 | Chen | G02B 6/4471 385/135 |
| 2015/0241642 A1* | 8/2015 | Hikosaka | G02B 6/3887 385/72 |

FOREIGN PATENT DOCUMENTS

| | | |
|---|---|---|
| JP | 62-079209 U | 5/1987 |
| JP | 01-129214 A | 5/1989 |
| JP | 01-129215 A | 5/1989 |
| JP | 03-008303 U | 1/1991 |
| JP | 03-011208 U | 2/1991 |
| JP | 05-273446 A | 10/1993 |
| JP | 06-016914 U | 3/1994 |

(Continued)

OTHER PUBLICATIONS

Notification of Reasons for Refusal for JP 2014-058844 dated Oct. 28, 2014.

(Continued)

*Primary Examiner* — Kaveh C Kianni (74) *Attorney, Agent, or Firm* — Sughrue Mion, PLLC (57) ABSTRACT

An optical fiber assembly of the present invention is configured such that an optical fiber fixing section (i) is fixed to an SUS tube and (ii) sandwiches an optical fiber between a first member and a second member at an end part of the SUS tube, so that the optical fiber is fixed while being spaced from the SUS tube. This makes it possible to provide an optical fiber assembly having a structure that prevents an optical fiber from coming into contact with an edge part of a metal tube on the premise that the optical fiber is covered with the metal tube.

4 Claims, 5 Drawing Sheets

(56) References Cited

FOREIGN PATENT DOCUMENTS

| | | |
|---|---|---|
| JP | 06-118272 A | 4/1994 |
| JP | 09-080258 A | 3/1997 |
| JP | 09-304654 A | 11/1997 |
| JP | 2000-193828 A | 7/2000 |
| JP | 2002-082257 A | 3/2002 |
| JP | 2003-302562 A | 10/2003 |
| JP | 2013-024987 A | 2/2013 |

OTHER PUBLICATIONS

Decision to Grant a Patent for Japanese Application 2014-058844 dated Jan. 20, 2015.

* cited by examiner

OPTICAL FIBER ASSEMBLY

This Nonprovisional application claims priority under 35 U.S.C. §119 on Patent Application No. 2014-058844 filed in Japan on Mar. 20, 2014, the entire contents of which are hereby incorporated by reference.

TECHNICAL FIELD

The present invention relates to an optical fiber assembly having a structure in which an optical fiber(s) going through a metal tube is to be fixed in the vicinity of an end part of the metal tube.

BACKGROUND ART

An optical fiber(s) is covered with a protection material for prevention of breakage and damage. A resin material is generally used as an optical fiber protection material.

However, in a case where an optical fiber(s) is used in an electronic device, there arises a problem that outgassing of, for example, siloxane occurs from resin which is a protection material, and consequently brings about an adverse effect on an electronic component in the electronic device.

Under the circumstances, in order to prevent the occurrence of outgassing, covering of an optical fiber(s) with a metal tube such as an SUS tube has been considered. Patent Literatures 1 and 2, for example, each disclose an example of covering an optical fiber(s) with a metal tube such as an SUS tube.

CITATION LIST

Patent Literature 1
Japanese Patent Application Publication, Tokukaihei, No. 9-304654 (Publication Date: Nov. 28, 1997)
Patent Literature 2
Japanese Patent Application Publication, Tokukai, No. 2003-302562 (Publication Date: Oct. 24, 2003)

SUMMARY OF INVENTION

Technical Problem

Unlike resin, a metal tube, such as an SUS tube, which serves as a protection material for an optical fiber(s), does not cause outgassing. However, there is a risk that the optical fiber(s) comes into contact with an edge part of the metal tube, and therefore breaks or becomes damaged.

The present invention has been made in view of the problem, and it is an object of the present invention to provide an optical fiber assembly having a structure that prevents an optical fiber from coming into contact with an edge part of a metal tube on the premise that the optical fiber is covered with the metal tube.

Solution to Problem

In order to attain the object, an optical fiber assembly of the present invention includes: a metal tube which covers an optical fiber; and an optical fiber fixing section which is fixed to an end part of the metal tube and which fixes the optical fiber, the optical fiber fixing section including two members having respective optical fiber sandwiching surfaces between which part of the optical fiber is sandwiched and fixed when the two members are combined together, the part of the optical fiber protruding from the end part of the metal tube, at least one of the two members having a cushion layer on its optical fiber sandwiching surface, the two members sandwiching the optical fiber while stress applied to the optical fiber is distributed by the cushion layer, the optical fiber fixing section having a groove into which the end part of the metal tube is inserted when the two members are combined together, the two members forming a fixing part for fixing the optical fiber, part of which fixing part protrudes out into the metal tube when the metal tube is inserted into the groove, and the optical fiber fixing section being fixed to the metal tube while the metal tube is inserted into the groove.

Advantageous Effects of Invention

An optical fiber assembly of the present invention brings about an advantageous effect of reliably preventing an optical fiber from breakage and damage which would be caused by the optical fiber coming into contact with an edge part of an end part of a metal tube.

DESCRIPTION OF EMBODIMENTS

The following description will discuss, in detail, an embodiment of the present invention.

[Basic Description of Optical Fiber Assembly]

Figure 1:
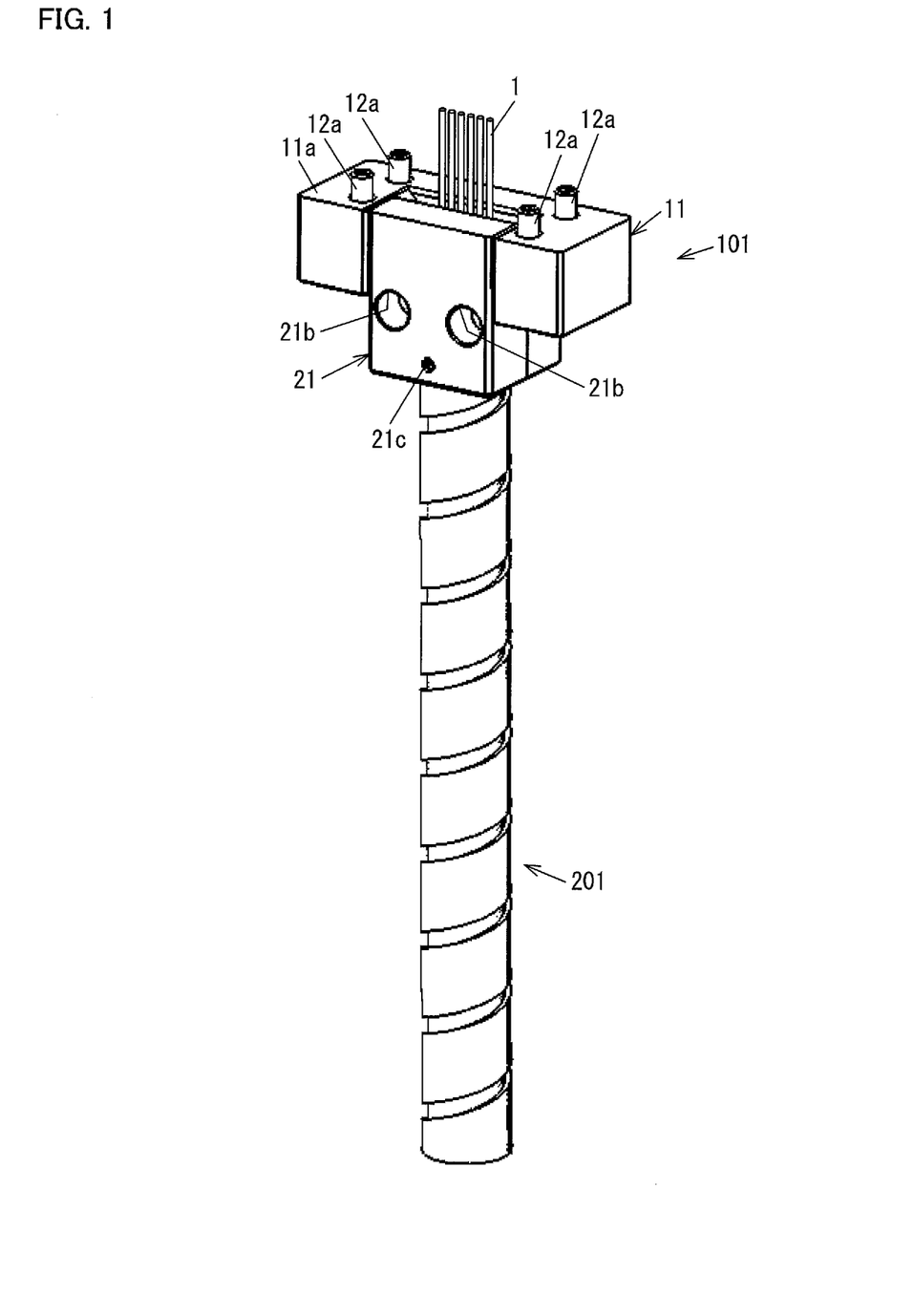
FIG. 1 is a perspective view schematically illustrating a configuration of an optical fiber assembly in accordance with the present embodiment.

As illustrated in FIG. 1, an optical fiber assembly in accordance with the present embodiment includes an optical fiber fixing section 101 and an SUS tube (metal tube) 201.

The SUS tube 201 serves as a covering member for covering a plurality of optical fibers 1 (6 optical fibers 1 in the present embodiment). The SUS tube 201 has a tube structure that can be freely bent in any desired direction without applying pressure inside the SUS tube 201. Note that examples of a covering member for covering the optical fibers 1 are not limited to the SUS tube 201, but encompass other metal tubes that do not cause outgassing.

At an end part of the SUS tube 201, the optical fiber fixing section 101 is fixed. The optical fiber fixing section 101 is configured to fix part of the optical fibers 1 which part protrudes from the end part of the SUS tube 201 and which part is therefore exposed.

The optical fiber fixing section 101 is configured to fix the optical fibers 1 by causing two members (first member 11 and second member 21) to sandwich the optical fibers 1 that protrude from the end part of the SUS tube 201. That is, the optical fiber fixing section 101 (i) is fixed to the SUS tube 201 and (ii) includes at least the two members (first member 11 and second member 21) that sandwich the optical fibers 1 so that the optical fibers 1 are fixed while being spaced from the SUS tube 201. Note that "fixing the optical fibers 1 while the optical fibers 1 are spaced from the SUS tube 201" means to fix the optical fibers 1 so that the optical fibers 1 are not in contact with the SUS tube 201.

A structure, by which the optical fiber fixing section 101 fixes the optical fibers 1, will be described in detail later.

The optical fibers 1 are sandwiched between the first member 11 and the second member 21, and are fixed so as to protrude from an end surface 11a, of all end surfaces of the first member 11, which is a surface opposite a side on which the SUS tube 201 is fixed.

Figure 2:
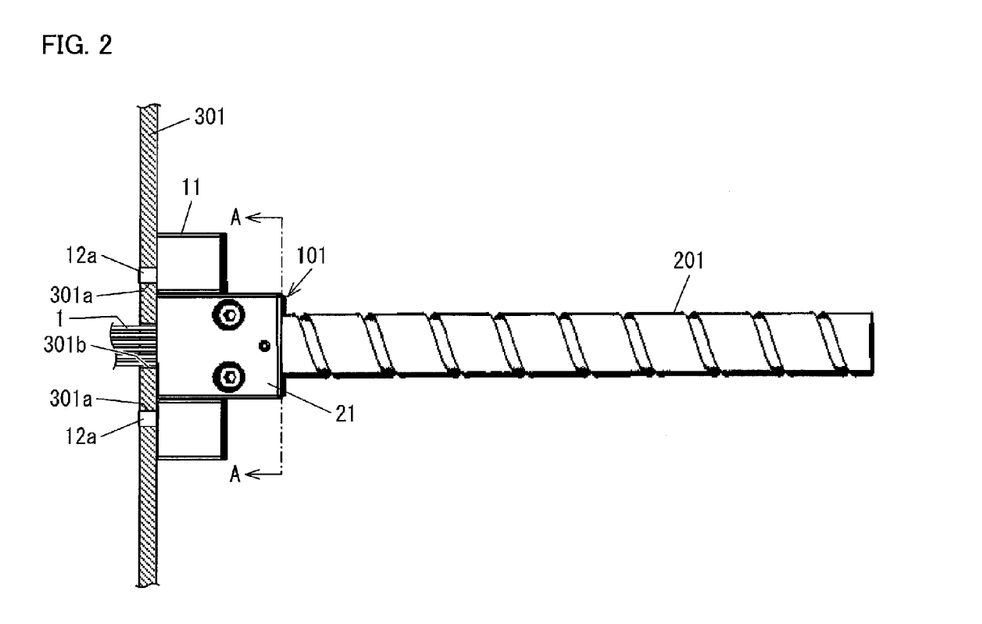
FIG. 2 is a cross-sectional view schematically illustrating how the optical fiber assembly illustrated in FIG. 1 is connected with a wall (by which a housing of an electronic device or the like is constituted).

The end surface 11a of the first member 11 has four protrusion parts 12a to be engaged with respective four engaging holes 301a (see FIG. 2) of a wall 301 (i.e. a wall by which a housing of an electronic device or the like is constituted; see FIG. 2) when the optical fiber fixing section 101 is connected with the wall 301. The protrusion parts 12a are parts of respective bolts 12, which parts protrude from the first member 11.

The second member 21 has two through holes 21b·21b and a single through hole 21c, all of which run from an end surface 21a, which is a surface opposite a counter surface facing the first member 11, through the first member 11. The two through holes 21b·21b are tapped holes via which the first member 11 and the second member 21 are connected by use of screws 22 (see FIG. 4). The single through hole 21c is an engaging hole with which a set screw 201a fixed to the end part of the SUS tube 201 (see FIG. 4) is to be engaged.

Therefore, the optical fiber fixing section 101 is fixed to the end part of the SUS tube 201 by (i) causing the first member 11 and the second member 21 to be connected by use of the screws 22 (see FIG. 4) and (ii) engaging the set screw 201a of the SUS tube 201 with the through hole 21c of the second member 21.

Then, the optical fiber assembly in a state in which the optical fiber fixing section 101 is fixed to the SUS tube 201 is configured such that the optical fibers 1, which are covered with the SUS tube 201, are inserted into the wall 301 by connecting the optical fiber fixing section 101 to the wall 301 (see FIG. 2).

In this case, (i) the four protrusion parts 12a protruding from the first member 11 are engaged, while the first member 11 is connected with the wall 301, with the respective four engaging holes 301a made at predetermined positions of the wall 301 and (ii) the optical fibers 1 protruding from the first member 11 run through a through hole 301b made at a part of the wall 301, which part falls in the middle of the four engaging holes 301a.

Figure 3:
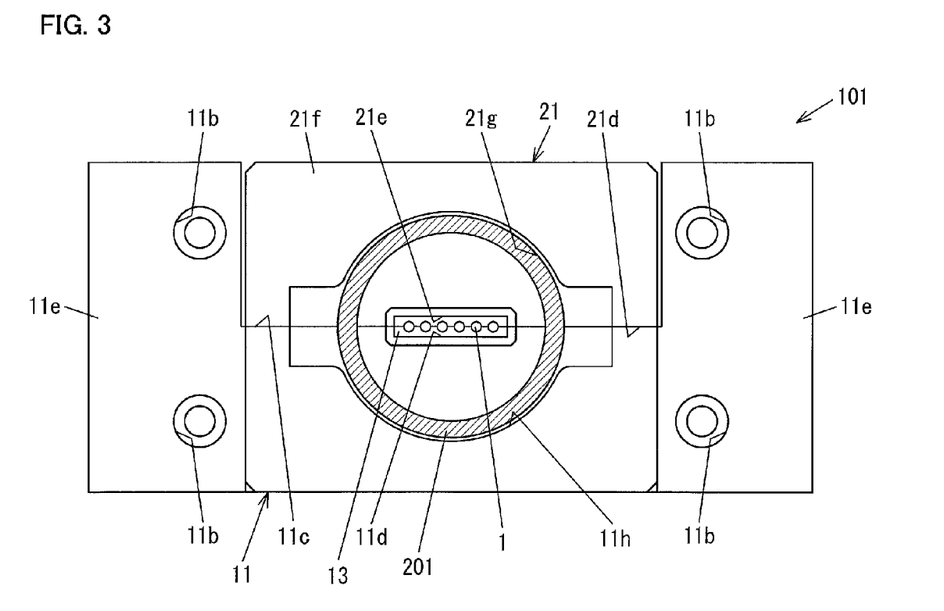
FIG. 3 is a cross-sectional view taken along the line AA drawn on the optical fiber assembly illustrated in FIG. 2.

Note that the optical fibers 1 are each configured by an element wire obtained by covering a surface of a structural glass of an optical fiber with only a single sheet of resin that causes an extremely small amount of outgassing. The optical fibers 1 are thus covered with no protection member for preventing breakage of and damage to the optical fibers 1. This causes part of the optical fibers 1, which part protrudes from the SUS tube 201 that is a protection member, to be prone to breakage and damage. Therefore, even in a case where the optical fibers 1 are fixed by the optical fiber fixing section 101, it is necessary to properly position the optical fibers 1 and to sandwich the optical fibers 1 between the first member 11 and the second member 21. Proper positioning of the optical fibers 1 is illustrated in FIG. 3. FIG. 3 is a cross-sectional view taken along the line AA drawn on the optical fiber fixing section 101 illustrated in FIG. 2.

As illustrated in FIG. 3, the optical fibers 1 are arranged and fixed in a width direction so as not to overlap one another in a fixing part which is formed by causing a fixing surface (optical fiber sandwiching surface) 11d of the first member 11 and a fixing surface (optical fiber sandwiching surface) 21e of the second member 21 to face each other. On the fixing surface 11d, a cushion layer 13 having adhesion and a cushioning property is provided. The cushion layer 13 causes the optical fibers 1 to be firmly fixed without overlapping one another. Note that the cushion layer 13 is made of a material that causes an extremely small amount of outgassing.

As has been described, the optical fiber assembly is configured such that the optical fibers 1 are thus fixed by the optical fiber fixing section 101. This prevents the optical fibers 1 from breakage and damage which would be caused by the optical fibers 1 (i) overlapping one another or (ii) coming into contact with an edge part of the SUS tube 201.

Although the cushion layer 13 has been described as having both adhesion and a cushioning property, the present embodiment is not limited to such a configuration. In fact, the cushion layer 13 can have one of the adhesion and the cushioning property. That is, the cushion layer 13 is not particularly limited in function, provided that the optical fibers 1 can be fixed by the optical fiber fixing section 101 so as to be prevented from breakage and damage.

[Detailed Description of Structure of Optical Fiber Fixing Section 101]

Figure 4:
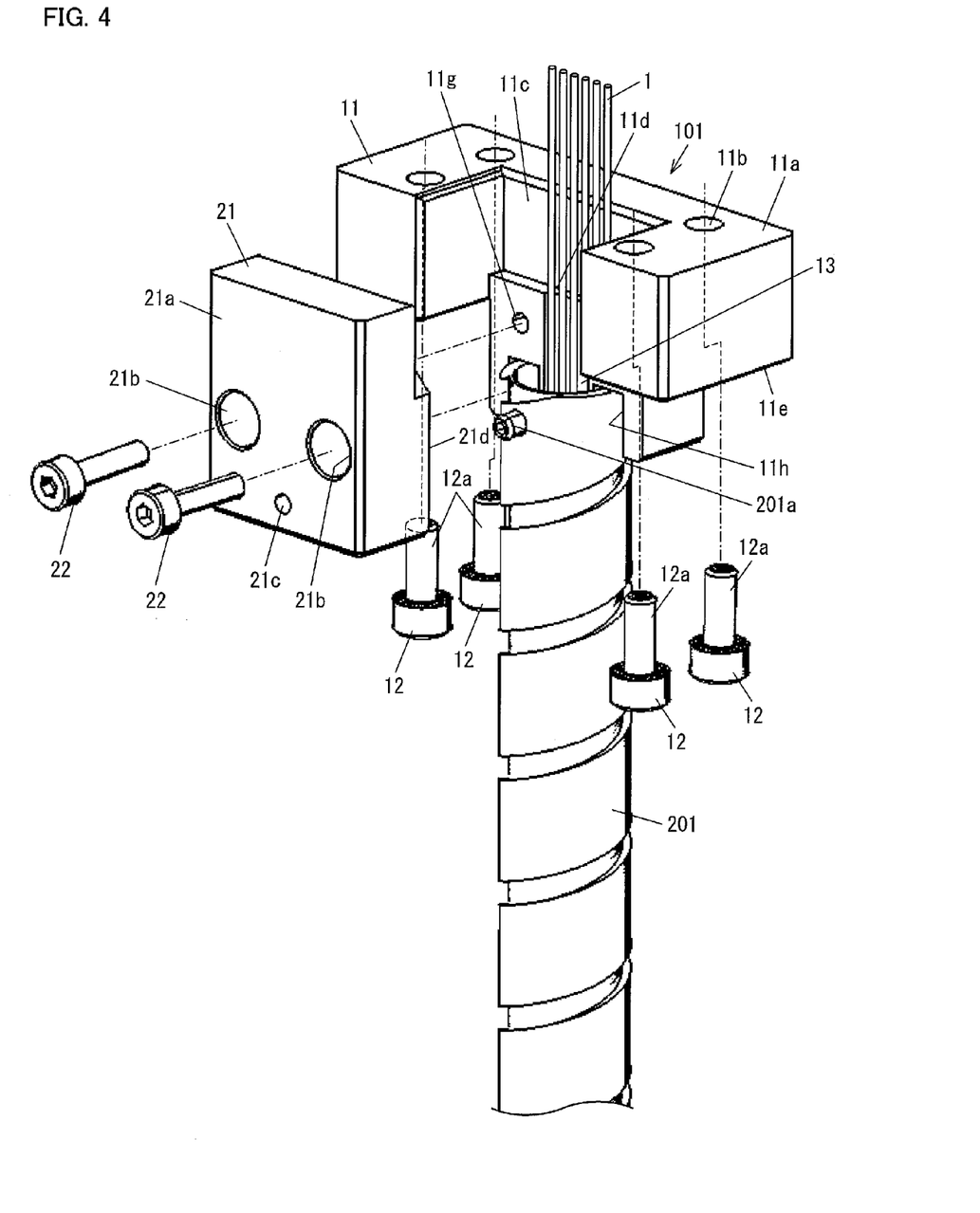
FIG. 4 is an exploded perspective view of the optical fiber assembly illustrated in FIG. 1.

FIG. 4 is an exploded perspective view breaking apart the optical fiber fixing section 101 of the optical fiber assembly illustrated in FIG. 1.

As has been described, the optical fiber fixing section 101 includes the two members: the first member 11 and the second member 21. Note that although the optical fiber fixing section 101 includes the two members according to the present embodiment, the optical fiber fixing section 101 can include three or four members and the like. Specifically, the optical fiber fixing section 101 only needs to include at least two members, provided that the optical fibers 1 can be properly sandwiched. The fixing surface 11d for fixing the optical fibers 1 is provided on an end surface 11c of the first member 11, which end surface 11c faces the second member 21. As illustrated in (a) of FIG. 5, the fixing surface 11d (i) has a substantially rectangular shape and (ii) has a width in a shorter side direction, which width is determined by the number of optical fibers 1 needed. A length of the fixing surface 11d in a longer side direction can be set to any length.

Figure 5:
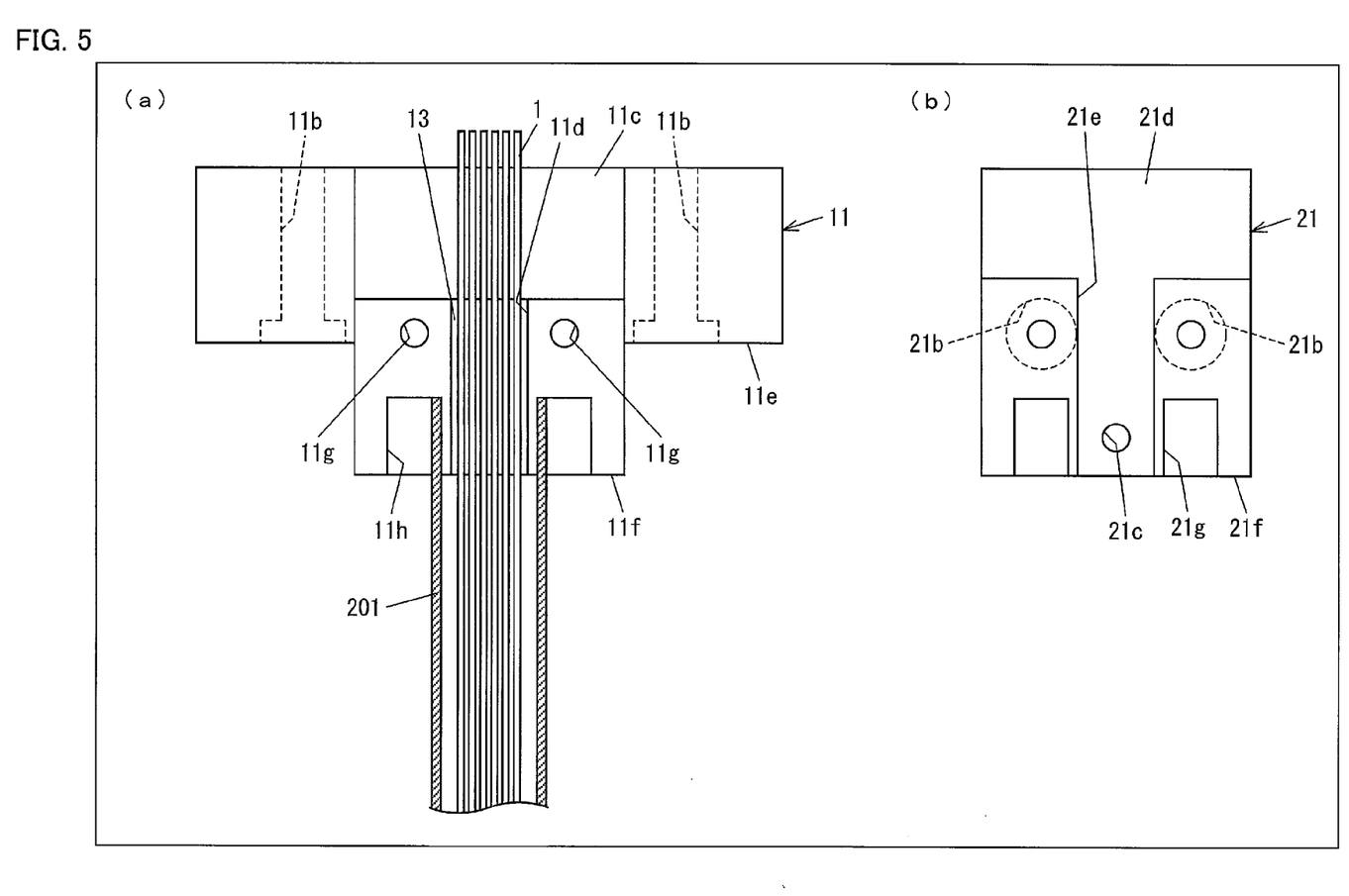
FIG. 5 is a set of views (a) and (b) illustrating components of an optical fiber fixing section of the optical fiber assembly illustrated in FIG. 1, (a) of FIG. 5 being a plan view of a first fixing member and (b) of FIG. 5 being a plan view of a second fixing member.

The fixing surface 11d is provided with the cushion layer 13 having a size substantially identical to that of the fixing surface 11d.

An end surface 11f is a surface to be connected with the SUS tube 201. On an end-surface-11f side of the fixing surface 11d, a groove 11h, into which the end part of the SUS tube 201 is to fit, is provided.

Note that, the first member 11 has four through holes 11b running from the end surface 11a through an end surface 11e which is a surface opposite the end surface 11a. Into the through holes 11b, the respective bolts 12 are inserted from an end-surface-11e side toward an end-surface-11a side such that tip parts of the respective bolts 12 protrude as protrusion parts 12a so as to be fixed in the first member 11.

Meanwhile, as illustrated in (b) of FIG. 5, the second member 21 has, on an end surface 21d facing the first member 11, the fixing surface 21e for fixing the optical fibers 1. The fixing surface 21e (i) has a substantially rectangular shape and (ii) has a width in a shorter side direction, which width is determined by the number of optical fibers 1 needed. A length of the fixing surface 21e in a longer side direction can be set to any length. That is, the shape of the fixing surface 21e is substantially identical to that of the fixing surface 11d of the first member 11.

As illustrated in (a) of FIG. 5, part of the fixing part for fixing the optical fibers 1 protrudes out into the SUS tube 201, which fixing part is configured by the fixing surface 11d of the first member 11 and the fixing surface 21e of the second member 21 facing each other. In other words, the SUS tube 201 is attached to the optical fiber fixing section 101 such that the end part of the SUS tube 201 fits into the groove 11h on an end-surface-11f side of the first member 11.

Since part of the fixing part for fixing the optical fibers 1 thus protrudes out into the SUS tube 201, the optical fibers 1 are fixed in the SUS tube 201. This reliably prevents part of the optical fibers 1, which part protrudes from the SUS tube 201, from coming into contact with the edge part of the end part of the SUS tube 201.

[Another Example of Configuration of Optical Fiber Fixing Section 101]

According to the optical fiber fixing section 101 illustrated in FIG. 3, a position of the fixing surface 11d in a vertical direction matches that of a reference surface which (i) runs through a center part of an inner diameter of the SUS tube 201 and (ii) extends parallel to the fixing surface 11d.

In this case, a boundary between the fixing surface 11d and the reference surface is unclear when the optical fibers 1 are to be placed on the fixing surface 11d. This causes a risk of placing the optical fibers 1 on a position shifted from the fixing surface 11d. The optical fibers 1 thus placed on a position shifted from the fixing surface 11d are to be sandwiched between surfaces (typically, surfaces on which the cushion layer 13 is not present) other than the fixing surface 11d. This poses a risk of causing breakage of or damage to the optical fibers 1.

Figure 6:
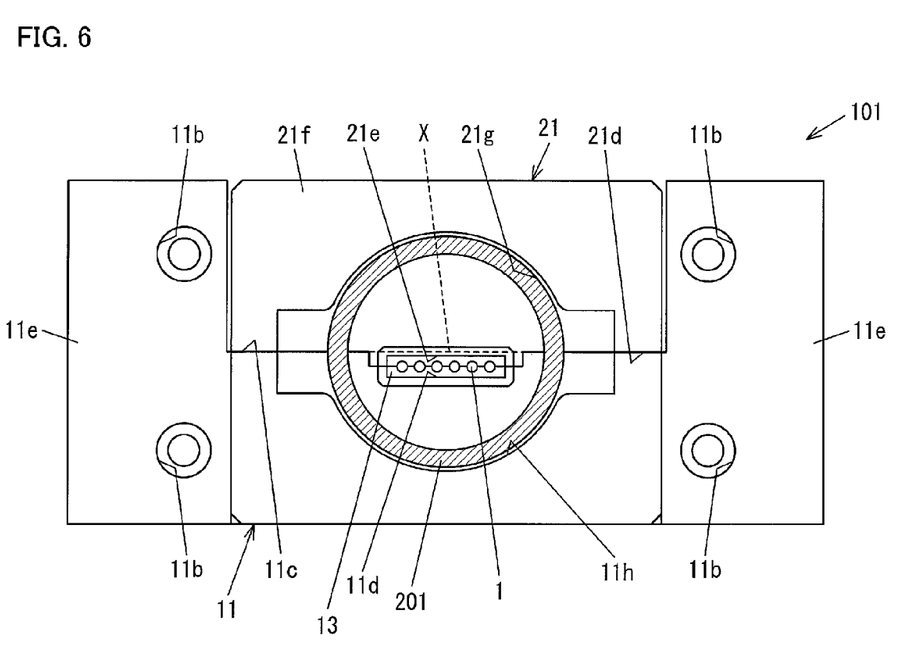
FIG. 6 is a cross-sectional view schematically showing such a modification of FIG. 3 that a position of an optical fiber fixing surface for fixing an optical fiber is shifted from that of a surface which runs through a center part of an inner diameter of an SUS tube and which extends parallel to the optical fiber fixing surface.

Therefore, as illustrated in FIG. 6, the position of the fixing surface 11d (on which the cushion layer 13 is provided) in the vertical direction can be shifted downwards from that of the reference surface X which (i) runs through the center part of the inner diameter of the SUS tube 201 and (ii) extends parallel to the fixing surface 11d. This causes a step between the fixing surface 11d and the reference surface X. Hence, the fixing surface 11d for fixing the optical fibers 1 can be easily distinguished from the reference surface X, and it is therefore possible to reliably place the optical fibers 1 on the fixing surface 11d for fixing the optical fibers 1. This makes it possible to avoid the case where the optical fibers 1 are sandwiched between surfaces other than the fixing surface 11d as a result of being placed on the position shifted from the fixing surface 11d for fixing the optical fibers 1.

[Effect of Optical Fiber Assembly]

According to the optical fiber assembly thus configured, the first member 11 of the optical fiber fixing section 101 is first attached to the end part of the SUS tube 201, and then part of the optical fibers 1, which part protrudes from the end part of the SUS tube 201, is placed on the cushion layer 13 of the fixing surface 11d for fixing the first member 11 (see (a) of FIG. 5). Then, the first member 11 and the second member 21 are connected with each other such that the fixing surface 21e of the second member 21 illustrated in (b) of FIG. 5 faces the fixing surface 11d of the first member 11. This causes the optical fibers 1 to be sandwiched and fixed between the fixing surface 11d and the fixing surface 21e. In so doing, part of the fixing surface 11d protrude out into the SUS tube 201. This allows for a structure in which part of the optical fibers 1 in the vicinity of the end part of the SUS tube 201 is prevented from coming into contact with the edge part of the end part of the SUS tube 201.

The optical fiber assembly allows a user to thus fix, at a desired position by use of the optical fiber fixing section 101, a desired number of optical fibers 1 which are covered with the SUS tube 201.

Hence, the optical fiber assembly allows for a structure in which a user can prevent optical fibers from coming into contact with an edge part of an end part of a metal tube in view of the number and length of optical fibers. This brings about an advantageous effect of preventing the optical fibers from breakage and damage which are caused by the optical fibers coming into contact with the edge part of the end part of the metal tube.

[Summary]

An optical fiber assembly of the present invention includes: a metal tube covering an optical fiber; and an optical fiber fixing section fixing the optical fiber to an end part of the metal tube, the optical fiber fixing section being fixed to the metal tube and including at least two members between which the optical fiber is sandwiched, so that the optical fiber is fixed so as to be spaced from the metal tube.

According to the configuration, the optical fiber is fixed to the end part of the metal tube by the optical fiber fixing section fixed to the metal tube such that the optical fiber is spaced from the metal tube. This allows the optical fiber in the vicinity of the end part of the metal tube from coming into contact with an edge part of the end part of the metal tube.

It is thus possible to form a structure in which the optical fiber is prevented from coming into contact with the edge part of the end part of the metal tube. This brings about an advantageous effect of preventing the optical fibers from breakage and damage which are caused by the optical fibers coming into contact with the edge part of the end part of the metal tube.

The optical fiber assembly of the present invention is preferably configured such that at least one of the at least two members included in the optical fiber fixing section has an adhesive layer on an optical fiber sandwiching surface thereof.

According to the configuration, at least one of the at least two members included in the optical fiber fixing section has an adhesive layer on an optical fiber sandwiching surface thereof. This allows the adhesive layer to reliably fix the optical fiber.

The optical fiber assembly of the present invention is preferably configured such that at least one of the at least two members included in the optical fiber fixing section has a cushion layer on the optical fiber sandwiching surface thereof.

According to the configuration, at least one of the at least two members included in the optical fiber fixing section has a cushion layer on the optical fiber sandwiching surface thereof. Therefore, while the optical fiber is sandwiched between the two members included in the optical fiber fixing section, stress applied to the optical fiber can be distributed by the cushion layer. This allows the optical fiber fixing section to fix the optical fiber without breaking or damaging the optical fiber.

The optical fiber assembly of the present invention is preferably configured such that at least part of the optical fiber fixing section protrudes out into the metal tube.

According to the configuration, at least part of the optical fiber fixing section protrudes out into the metal tube. This allows said at least part of the optical fiber fixing section to be fixed in the metal tube, and therefore reliably prevents the optical fiber in the vicinity of the end part of the metal tube from coming into contact with the edge part of the end part of the metal tube.

The optical fiber assembly of the present invention is preferably configured such that the optical fiber sandwiching surface of at least one of the at least two members is shifted from a reference surface that (i) runs through a center part of an inner diameter of the metal tube and (ii) extends parallel to the optical fiber sandwiching surface.

According to the configuration, the optical fiber sandwiching surface of at least one of the at least members is shifted from a reference surface that (i) runs through a center part of an inner diameter of the metal tube and (ii) extends parallel to the optical fiber sandwiching surface. This causes a step between the optical fiber sandwiching surface and the reference surface. Hence, the optical fiber sandwiching surface can be easily distinguished from the reference surface, and it is therefore possible to reliably place the optical fiber on the optical fiber sandwiching surface. This makes it possible to avoid a case where the optical fiber is sandwiched between surfaces other than the optical fiber sandwiching surface as a result of being placed on the position shifted from the optical fiber sandwiching surface.

[Additional Remarks]

The present invention is not limited to the description of the embodiments, but can be altered in many ways by a person skilled in the art within the scope of the claims. An embodiment derived from a proper combination of technical means disclosed in different embodiments is also encompassed in the technical scope of the present invention.

INDUSTRIAL APPLICABILITY

The present invention is suitable for a device using an optical fiber(s), particularly for a device in which the occurrence of outgassing should be avoided.

REFERENCE SIGNS LIST

1 Optical fiber
11 First member
11a End surface
11b Through hole
11c End surface
11d Fixing surface
11e End surface
11f End surface
12 Bolt
12a Protrusion part
13 Cushion layer
21 Second member
21a End surface
21c Through hole
21d End surface
21e Fixing surface
22 Screws
101 Optical fiber fixing section
201 SUS tube (metal tube)
201a Set screw
301a Engaging hole
301b Through hole
X Reference surface

The invention claimed is:

1. An optical fiber assembly comprising:
an optical fiber;
a metal tube which covers the optical fiber such that a part of the optical fiber protrudes from an end part of the metal tube; and
an optical fiber fixing section which is configured to fix the part of the optical fiber,
wherein the optical fiber fixing section comprises a first member having a first optical fiber sandwiching surface having a groove at an end thereof and a second member having a second optical fiber sandwiching surface, wherein the part of the optical fiber is directly sandwiched and fixed between the first optical fiber sandwiching surface and the second optical fiber sandwiching surface when the first member and the second member are combined together,
wherein:
the groove is configured to fit and fix the end part of the metal tube,
at least one of the first member and the second member comprising a cushion layer on its optical fiber sandwiching surface,
the first optical fiber sandwiching surface and the second optical fiber sandwiching surface sandwiching the optical fiber so that stress applied to the optical fiber is distributed by the cushion layer,
the end part of the metal tube is fitted in the groove, and
the first optical fiber sandwiching surface and the second optical fiber sandwiching surface are configured to protrude into an internal space of the metal tube so as to prevent the optical fiber from breakage and damage caused by the optical fiber contacting the end part of the metal tube.

2. The optical fiber assembly as set forth in claim 1, further comprising,
an adhesive layer disposed on one of the first optical fiber sandwiching surface and the second optical fiber sandwiching surface.

3. The optical fiber assembly as set forth in claim 1, wherein
at least one of the first optical fiber sandwiching surface and the second optical fiber sandwiching surface is shifted from a reference surface which runs through a center part of an inner diameter of the metal tube and extends parallel to the at least one of the first optical fiber sandwiching surface and the second optical fiber sandwiching surface.

4. The optical fiber assembly as set forth in claim 2, wherein
at least one of the first optical fiber sandwiching surface and the second optical fiber sandwiching surface is shifted from a reference surface which runs through a center part of an inner diameter of the metal tube and extends parallel to the at least one of the first optical fiber sandwiching surface and the second optical fiber sandwiching surface.

\* \* \* \* \*